United States Patent [19]

Höhle et al.

[11] Patent Number: 4,820,900

[45] Date of Patent: Apr. 11, 1989

[54] VACUUM PLASMA SPRAY SYSTEM WITH SEALED MANIPULATOR

[75] Inventors: Hans-Michael Höhle, Ladenburg; Werner Pick, Bad Soden-Salmünster; Michael Malakas, Linsengericht, all of Fed. Rep. of Germany

[73] Assignee: The Perkin-Elmer Corp., Norwalk, Conn.

[21] Appl. No.: 91,816

[22] Filed: Sep. 1, 1987

[30] Foreign Application Priority Data

Sep. 2, 1986 [EP] European Pat. Off. ............ 86112122

[51] Int. Cl.$^4$ .................................................. B05B 7/20
[52] U.S. Cl. ........................... 219/121.47; 219/121.43; 219/121.15; 219/121.28; 219/121.33; 118/323; 118/326; 118/50; 427/34
[58] Field of Search .................. 219/121 PL, 121 PG, 219/121 EE, 121 EU, 121 EZ, 76.16; 901/18, 43; 118/323, 326, 50, 50.1; 427/34

[56] References Cited

U.S. PATENT DOCUMENTS

| | | | |
|---|---|---|---|
| 3,606,667 | 9/1971 | Kreider | 427/34 X |
| 3,626,142 | 12/1971 | King | 219/121 EU X |
| 4,328,257 | 5/1982 | Muehlberger et al. | 427/34 |
| 4,576,828 | 3/1986 | Walker, Jr. | 427/34 |
| 4,656,331 | 4/1987 | Lillquist et al. | 219/121 PL |
| 4,677,273 | 6/1987 | Colegrove et al. | 219/121 EU X |

Primary Examiner—Shrive Beck
Assistant Examiner—Alain Bashore
Attorney, Agent, or Firm—H. S. Ingham; F. L. Masselle; E. T. Grimes

[57] ABSTRACT

A vacuum plasma spray system includes a spray chamber, a motor-driven manipulator including a drive mechanism and a respective control system, and a plasma gun mounted on the manipulator in the spray chamber. The drive mechanism comprises three drive groups of which a first drive group facilitates upward and downward motion of the gun for adjusting spray distance and second and third drive groups facilitate swiveling motions of the gun around horizontal axes. The manipulator has a hermetically sealed outer housing and a hermetically sealed inner housing contained in the outer housing. The inner housing contains the second and third drive groups, protrudes into the chamber and carries the gun. The first drive group is arranged at least partially in the outer housing to effect lifting or lowering of the inner housing thereby adjusting spray distance.

15 Claims, 6 Drawing Sheets

VACUUM PLASMA SPRAY SYSTEM WITH SEALED MANIPULATOR

BACKGROUND OF THE INVENTION

The invention concerns a vacuum plasma spray system with a vacuum spray chamber in which a workpiece can be placed, with a device for producing a vacuum in the spray chamber and with a plasma gun located in the spray chamber, the position of which can be changed relative to the workpiece in at least one moving direction by means of a motor-driven drive mechanism and a respective control system.

A vacuum plasma spray system is known from the DE-OS No. 30 43 830.

By means of such vacuum plasma spray systems it is possible to provide workpieces with a coating which is applied in plasma spraying process. For this purpose the workpiece is placed in the spray chamber. The spray chamber is then evacuated. The powdery material is then sprayed in thin layers onto the workpiece by means of the gun.

In order to reliably coat the entire surface of the workpiece with the desired coating, the plasma gun is connected to a drive and control mechanism which allows the plasma gun to move at least in one moving direction relative to the workpiece. The number of axes required for the gun depends on the workpiece to be coated.

The system described in DE-OS No. 30 43 830 contains the essential parts required for drive of the gun, i.e. the entire drive mechanism, inside the spray chamber. The drive mechanism facilitates three moving directions of the plasma gun, namely a vertical motion for adjusting the spray distance, a translational motion in the workpiece axis (reciprocating motion of the gun manipulator) and a swivelling motion.

A mechanically complex moving system is required for these motions, which — as mentioned above — is inside the spray chamber. This means that several guide rods, cardan joints, telescopes, toothed racks with pinions are contained without protection in the spray chamber so that the extremely aggressive atmosphere of the spray chamber (vacuum, heat, dust) can affect the entire mechanic system. Therefore, reliability of the entire drive system is doubtful since owing to the mentioned ambient conditions within the spray chamber faults of or damage to the mechanical drives might easily occur.

A further disadvantage of this known system is the very large surface, on which dust can deposit, resulting from accommodating the entire mechanic system in the spray chamber. Moreover, dust may deposit in recesses or hollows from which it cannot be easily removed. In addition, such mechanic system has a large number of narrow gaps and hollows that are difficult to evacuate. Therefore, when evacuating the spray chamber, residual oxigen escapes from these gaps and hollows for some time which has unfavourable effects on the coating process.

Another known plasma spray system uses a robot inside the spray chamber for moving the plasma gun relative to the workpiece. From the kinematic point of view this design is suitable for coating complex workpieces. For coating, both robot and turntable are pushed into the chamber and the door is closed.

Hereby, all components inside the spray chamber are subject to extreme heat, dust and vacuum exposure. This particularly applies to the complex mechanic system of the robot with its drives and measuring systems as well as to the turntable.

This solution, too, has the serious disadvantage that a number of hollows and gaps exist in which powder desposits and which form air pockets. Both factors result in a deterioration of the inert atmosphere and hence affect the spray results. A further, serious disadvantage is the fact that it is difficult to clean the entire system (in this context it should be considered that, as a rule, 1 to 2 kgs powder or dust result during production runs in such plasma spray system, which remain in the chamber).

SUMMARY OF THE INVENTION

On the basis of this state-of-art the object of the invention is to design a vacuum plasma spray system, as mentioned in the beginning, so as to make the drive for the plasma gun substantially less sensitive to faults and moreover, to facilitate easy cleaning of the spray chamber.

With the vacuum plasma spray system of the kind specified in the beginning this object is achieved by locating the entire drive mechanism and the control system in housing parts of the manipulator, fastened on top of the spray chamber, and hermetically sealing them against the spray chamber.

Owing to the location of all drives outside detrimental atmosphere of the spray chamber no faults resulting from dust and/or heat effects will occur at the drive. Moreover, neither dust pockets nor hollows can form which could lead to degasing during evacuation and would thus substantially deteriorate the coating quality. Surface in the spray chamber is reduced to a minimum and can be easily cleaned since no badly accessible edges and corners exist.

An advantageous development of the invention provides that the drive mechanism in the manipulator comprises three drive groups of which the first drive group facilitates upwards and downward movement of the gun for adjusting the spray distance the second drive group facilitates a swivelling motion of the gun around a first horizontal axis and the third drive group facilitates a swivelling motion of the gun around a second horizontal axis at a right angle with the first horizontal axis.

These features allow the manipulator to move the gun around three axes. By means of the first axis the gun can move upwards and downwards for adjusting the spray distance. The second axis facilitates a swivelling motion of the gun in transverse direction of the spray chamber and the third axis facilitates a swivelling motion in vertical direction of the spray chamber. The two swivelling motions defined by the horizontal axes are displaced by 90° to each other, which results in a large coating surface which can be reached by the plasma gun. The third drive group is designed to allow the swivelling motion of the second horizontal axis to the extent that the gun can also spray in horizontal direction. By choosing the thus defined moving axes of the gun, all gun motions necessary for coating a large number even of complicated workpieces, such as turbine blades, can be obtained.

Owing to these two swivelling motions, blade shapes of turbine blades as well as the blades profiles themselves can be optimally coating. A further advantageous design of the invention provides that the manipulator has an outer housing and an inner housing contained in the outer housing; that the inner housing contains the hermetically sealed second and third drive groups; the inner housing protrudes into the spray chamber and carries the gun at the end situated in the spray chamber; and that the first drive group is arranged at least partially in the outer housing to effect lifting or lowering of the inner housing.

Hence, this solution provides location of the drives for the two swivelling motions in a separate inner housing which can be lifted or lowered by the first drive group in an outer housing.

Preferentially, the inner housing is guided by means of slideways at sliding rods vertically extending in the outer housing. The drive motor for the first drive group is flanged to the outer housing. To ensure a pressure-proof and dust-tight leadthrough of the motor drive through the outer housing wall, an appropriate rotary transmission leadthrough is provided at the wall of the outer housing.

The rotary transmission leadthrough is preferentially designed to operate with two o-ring seal; back-up evacuation is provided between the o-ring seals. In case of a leakage, there will be evacuation between the o-rings to prevent air from entering the manipulator interior. two o-ring seals; back-up evacuation is provided between the o-ring One of the preferential designs of the inner housing has the following partial housings:

a drive housing containing the drive motors of the second and third drive group as well as the control systems for the drive groups, an intermediate housing adjacent to the spray chamber through which the drive shafts of the two drive groups extend, a swivel housing including a swivel mechanism belonging to the second drive group, and a gear housing which is fastened to the swivel housing and which contains a drive mechanism belonging to the third drive group; the gun is fastened to the gear housing and is swivelling around the second horizontal axis. Hence the inner housing consists of several partial housings, all sealed against the spray chamber. The drive mechanisms belonging to the second and third drive group extend through in the individual housings. The housing parts hermetically seal these drive mechanisms and dust cannot enter the interior of the inner housing.

The divison of the inner housing into individual partial housings facilitates easy assembly and, if required, replacement and maintenance of the parts of the drive mechanism located in the individual partial housings. For connection of the individual partial housings intermediate flanges are provided by which the drive housing, the intermediate housing, the swivel housing and the gear housing have vacuum-tight connection to each other. For this purpose, o-ring seals or the like can be used on both sides of the flanges.

In a concrete design, the second drive group comprises a drive shaft which is driven by the drive motor of the second drive group via a toothed belt and the rotary motion of which is transformed into swivel motions by a swivel mechanism in the swivel housing. For this purpose, the swivel mechanism comprises a spindle which is connected to the drive shaft and is swivelling around a cross axis, and which turns a slide with a respective inside thread; the slide is fastened in bearing brackets, connected to the inside wall of the swivel housing, and is swivelling around an axis at a right angle with the spindle axis. By means of this swivel mechanism the rotary motion of the drive shaft is converted into a swivelling motion of the swivel housing. As the gear housing is fastened to the swivel housing and carries the gun, swivelling motion around the first horizontal axis is easily accomplished.

Preferentially, the third drive group comprises the following parts:

a drive shaft, driven by the drive motor of the third drive group via a toothed belt pulley and extending through the intermediate housing into the swivel housing, a cardan shaft as an extension of the drive shaft through the swivel housing and an angular gear, located in the gear housing, with a toothed belt transmission which transforms the rotary motion of the drive shaft into a swivelling motion of the gun around the second horizontal axis. By these means, the swivel drive of the gun around the second horizontal axis is diverted via suitable shafts by the drive motor arranged for this purpose in the upper drive housing; the shaft in the swivel housing is extended by a cardan shaft. Thus, drive can easily be performed at any swivel position of the swivel housing.

Of course, due to the drive groups being driven independently of each other, the individual drive motions may be performed individually or in overlapping moving directions, i.e. the gun can be moved into any direction.

A further, concrete design of the invention provides for a flange on the spray chamber top onto which the vacuum-tight outer housing is flange and through which the inner housing with its partial housings extends into the spray chamber; a bellows, reaching into the spray chamber, is fastened to the flange; the bellows has vacuum-tight connection to the inner housing in the area of the flange between the intermediate housing and the swivel housing. This bellows forms a flexible dust and heat shield and thus protects the outer housing and parts of the inner housing against the strong heat within the spray chamber. This heat and dust shield is designed as a bellows so that is can accompany without impairment the upward and downward motions of the gun when being lifted or lowered by the first drive group.

The bellows extends laterally almost over the whole length of the swivel housing and is fastened to the flange between the intermediate housing and the swivel housing by a dome-shaped recess. Hence the bellows covers the swivel housing at least partially and shields it from outside against dust and heat.

According to a further preferential design the walls of the partial housings located in the inner housing and the walls of the outer housing are, at least partially, provided with double walls and with connections for cooling water flow between the double walls. This allows complete water cooling of entire mechanical system, shielding the mechanical system completely against heat effects.

The complete hermetical sealing of the inner housing allows optimum protection of the drive mechanism in the inner housing by evacuating the interior of the inner housing once and filling it then with an inert gas, particularly with argon. Pressure of the argon filling is slightly above atmospheric pressure and is continuously controlled. Owing to the use of argon there will be no danger to the spraying process even if a leakage occ Preferentially, pressure compensation of the interior of the outer housing is by a dust-proof connection with the spray chamber, i.e. pressure compensation is possible between the interior of the outer housing and the spray chamber. Therefore, there is always cold, dust-free vacuum condition in the interior of the outer housing.

BRIEF DESCRIPTION OF THE DRAWINGS

In the following, the invention is described in detail on the basis of an example shown on the drawing.

DETAILED DESCRIPTION OF THE INVENTION

Figure 1:
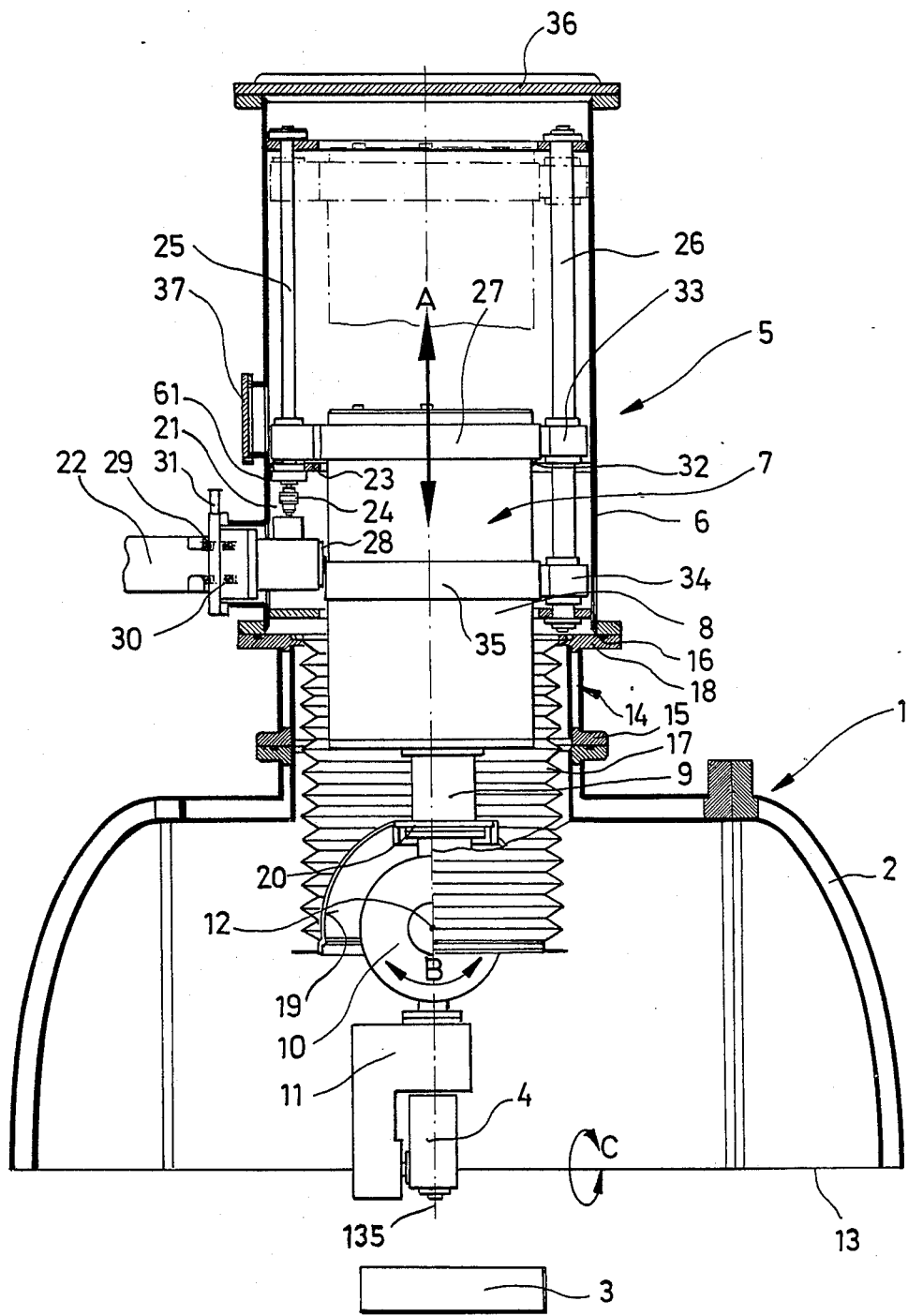
FIG. 1 shows a longitudinal section of a part of the vacuum spray system with a manipulator acc. to the invention and the spray chamber

In FIG. 1, the the complete vacuum plasma spray system is numbered 1. Of the spray system, only the parts essential in context with the invention are shown. The plasma spray system comprises a spray chamber 2, into which a workpiece can be placed. In such system, the workpiece 3 is to be coated using a plasma gun 4. The state-of-art knows this process as vacuum plasma spray process.

The entire manipulator according to the invention is numbered 5 and carries the gun 4 at an end protruding into the spray chamber 2. By means of the manipulator 5, the position of the gun 4 can be changed relative to the workpiece 3 in a way to be described in detail.

The manipulator 5 according to the invention comprises an outer housing 6, which is mounted on top of the spray chamber to a flange 14 and which is pressure-tight. The outer housing contains an inner housing, numbered 7, which is guided on guide rods and which can be lifted and lowered. The inner housing consists of partial housings flanged to each other. The upper housing 8 is the drive housing for a drive mechanism to be described in detail. This drive housing 8 is joined by an intermediate housing 9 towards the spray chamber 2. This intermediate housing is adjoined by a swivel housing 10 which, in turn, is fastened to the gear housing 11. The plasma gun 4 is fastened to the gear housing.

By means of this manipulator 5 the gun 4 can be moved around three axes at right angles with each other. The first moving direction is represented by arrow A and consists of an upwards and downwards motion by which the distance of the gun 4 to the workpiece 3 can be increased and reduced. Besides these possibilities of shifting in vertical direction, there are two possibilities of swivelling around two horizontal axes at a right angle with each other. The first horizontal axis 12 extends through the swivel housing and makes it possible to swivel the gun in the direction of arrow B to the right or left side in FIG. 1. The second horizontal axis 13 extends through gear housing 11 and makes swivelling motion of the gun 4 possible in the two turning directions of arrow C.

As can be seen from FIG. 1, the outer housing 6 is mounted to the flange 14, as mentioned, and is connected with the spray chamber 2 by this flange. To obtain vacuum-tight connection, o-rings 15 and 16 are arranged at the flange collar. At the inside opening of the upper flange collar 18 of the flange 14 the upper end of a bellows 17 is fastened. The bellows extends beyond the horizontal plane of the first horizontal axis 12 of swivel housing 10 into spray chamber 2 and completely covers the intermediate housing 9 and partially covers swivel housing 10. At the bottom of the bellows 17 there is a dome-shaped recess 19 reaching up to the flange 20 by which the intermediate housing 9 is tightly connected to the swivel housing 10.

This bellows serves as heat and dust shield for the free space between the outer housing 6 and inner housing 7. The bellows can accompany the lifting and lowering movements of the inner housing without impairment.

A first drive group numbered 21 which is mainly accommodated in the outer housing 6, serves for lifting and lowering of the inner housing 7 and thus for changing the spray distance of the gun to the workpiece in vertical direction.

This first drive group 21 includes a drive motor 22 which is led through the housing wall 61 of the outer housing 6 by means of a rotary transmission leadthrough. The rotary transmission leadthrough comprises two o-rings 29 and 30, arranged at a distance to each other in axial direction of the shaft 28 led through. A connection line 31, through which back-up evacuation can be effected, ends between these two o-rings. The drive motor 22 acts via known methods and bearing 24 on spindle 25 which is driven by the motor. A supporting ring 27 is welded to the outside of the inner housing 7 (weld seam 22). This supporting ring is connected to the threaded nut 31 so that the inner housing 7 is lifted via this nut by means of the supporting ring when the spindle 25 rotates. Two guide rods 26 are fastened to the side opposite the spindle 25 in the outer housing 6; by these, the inner housing 7 is guided with the corresponding slideways 33 and 34 via supporting ring 27 and supporting ring 35 arranged below.

Hence the inner housing 7 can be lifted or lowered in direction of arrow A inside the outer housing 6 by means of the first drive group 21. The outer housing is closed by a vacuum-tight cover 36 and, in addition, has a further connection 37 to which, for instance, a vacuum pump or the like can be connected. The entire housing 6 is hermetically sealed and can therefore be set under vacuum.

Figure 2:
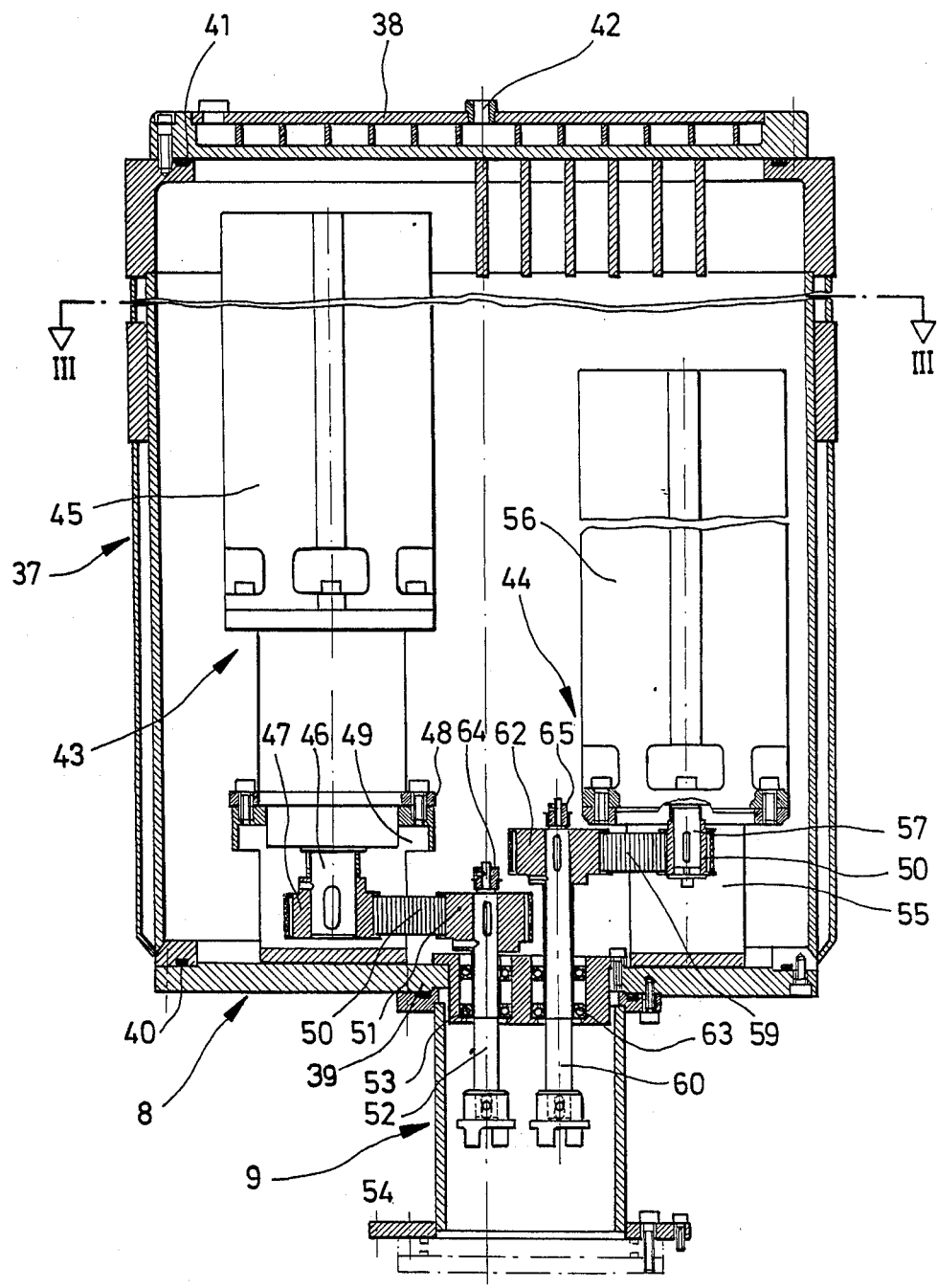
FIG. 2 shows a longitudinal section through the drive housing

In the following, the structure of the inner housing 7 with the individual partial housings 8, 9, 10, and 11 is described. FIG. 2 shows a longitudinal section of the drive housing 8. It has a double-walled cylindrical external wall 37 and is hermetically sealed by the cover 38 on top and by bottom 39 on bottom. For this purpose, o-rings 40 and 41 are employed between bottom and cover respectively and the housing walls. Moreover, the cover 38 is double-walled and has a connection 42 through which cooling water for cooling of the cover can be led in.

The drive housing 8 contains parts of the two other drive groups 43 and 44. The drive group 43 has a motor 45 driving a shaft 46; on the shaft end projecting from the motor there is a toothed belt pulley. The motor 45 is supported by a flange 48 on pedestal 49 which, in turn, is attached to the housing bottom 39. Drive of the motor 45 is transmitted by the toothed belt 50 and the toothed belt pulley 51 to the drive shaft 52. In the bottom area 39 the drive shaft 52 is running on a rolling bearing 53. At the lower end of the drive shaft 52 which protrudes into the intermediate housing 9, there is a connecting journal 54 adjustable in height by which the drive shaft 52 can be connected to a cardan shaft, to be described in detail, for continuation of the turning drive.

The third drive group 44 comprises a motor 56 also support on a pedestal 55 as against the housing bottom 10 the drive of which, similarly to the second drive group, is transmitted via a toothed belt pulley resting on the motor shaft, a toothed belt 59 and a toothed belt pulley 62 attached to drive shaft 60. The drive shaft 60 is also led into the intermediate housing 9 through bottom 39 via a bearing 63.

Figure 3:
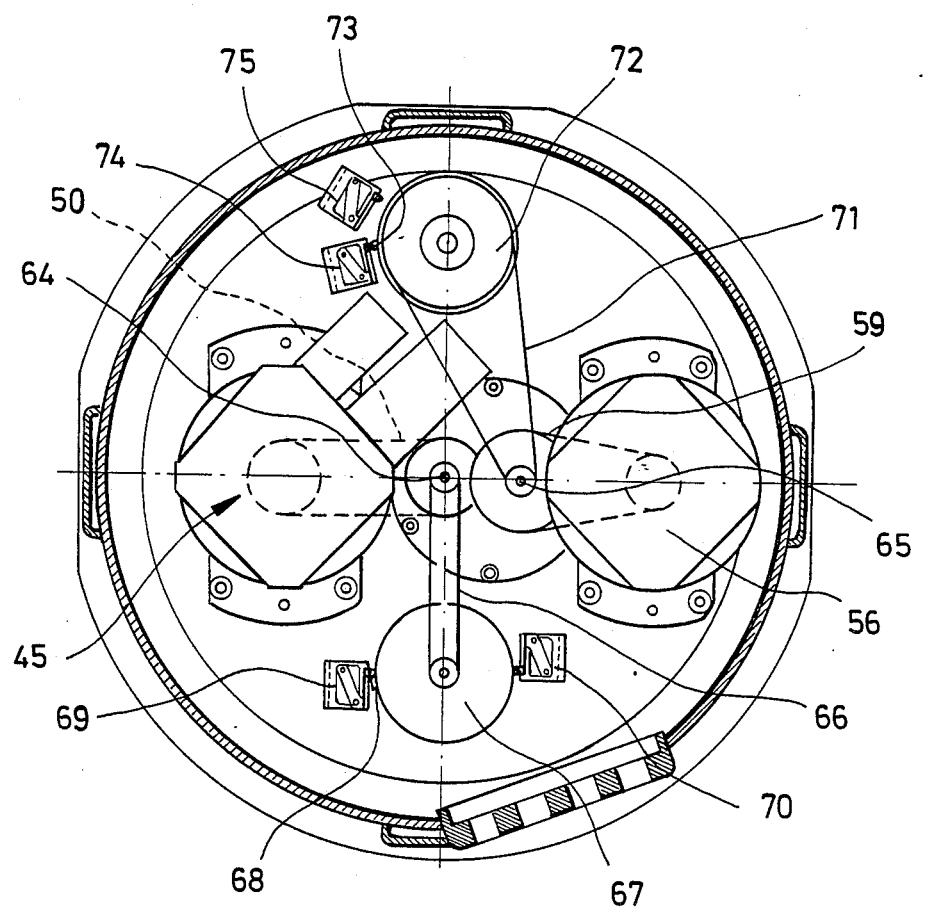
FIG. 3 shows a cross section along the line II—II of FIG. 2 through the drive housing

As can be seen on FIG. 3 which represents a section along the line III—III of FIG. 2 further toothed belt pulleys 64 and 65 are attached to the drive shafts 52 and 60 above the toothed belt pulleys 51 and 62. The toothed belt pulley 64 is connected to a control pulley 67 via a toothed belt 66. A control cam 68 is located at control pulley 67 which co-operates with pressure switches 69 and 70. These pressure switches 69 and 70 act as limit switches and serve for control of the drive motor 45. The switches are at such distance to each other that they switch off the control pulley 67 after a 180° rotation.

The toothed belt 71 leads from the toothed belt pulley 65 to a further control pulley 72 also provided with a control cam 73 which co-operates with limit switches 74 and 75 for control of the drive motor 56. Thus the mechanical control elements required for motor 56 and 45 are also hermetically sealed in the drive housing 8.

In the following, continuation of the first and second drive group in the swivel housing 10 is further described on the basis of FIGS. 4 and 5.

The drive shaft 52 (cp. FIG. 2) protruding into the intermediate housing 9 has a fixed turning connection to an adjoining shaft section 75 by means of a connection journal 74 adjustable in height. The shaft section 75 is led through a flanged-on cover 76 into the intermediate housing 9. The leadthrough of the cover is equipped with a roller bearing 77. The drive shaft 74 and the shaft section 75 are then extended by a cardan shaft 78 in the swivel housing and led through an outlet 79 downwards into gear housing 11. The cardan connection is necessary to allow the drive to accompany the swivelling motions of swivel housing 10.

The swivel housing 10 comprises an outer housing 80 inside which a drum 81 is arranged which can rotate in the housing 80 around the first horizontal axis 12. For rotation of the inner drum 81 a spindle is provided as a continuation of the drive shaft 60 (cp. FIG. 2) via a connection journal 82. The spindle is running on a bearing 84 and is swivelling around a horizontal axis 85 at a right angle with the spindle axis. By the rotary motion of the drive shaft 60 the spindle is rotated; on this spindle a slide 86 with an inside thread can thus be moved upwards and downwards. The slide 86 is fastened laterally by the bearing journals 88 in two bearing brackets (87) connected to the drum 81 and can be swivelled around the axis 89.

Figure 4:
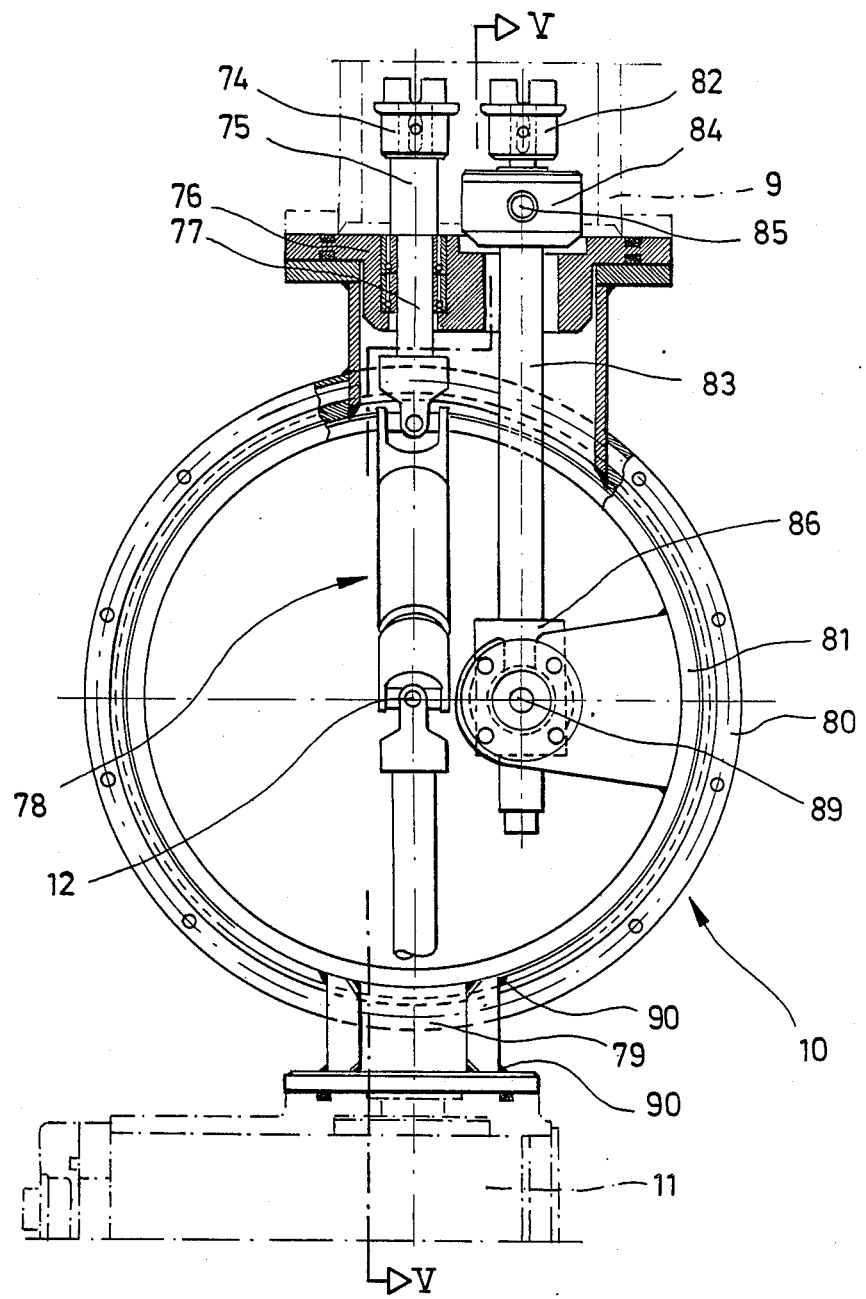
FIG. 4 shows a longitudinal section through the swivel housing
Figure 5:
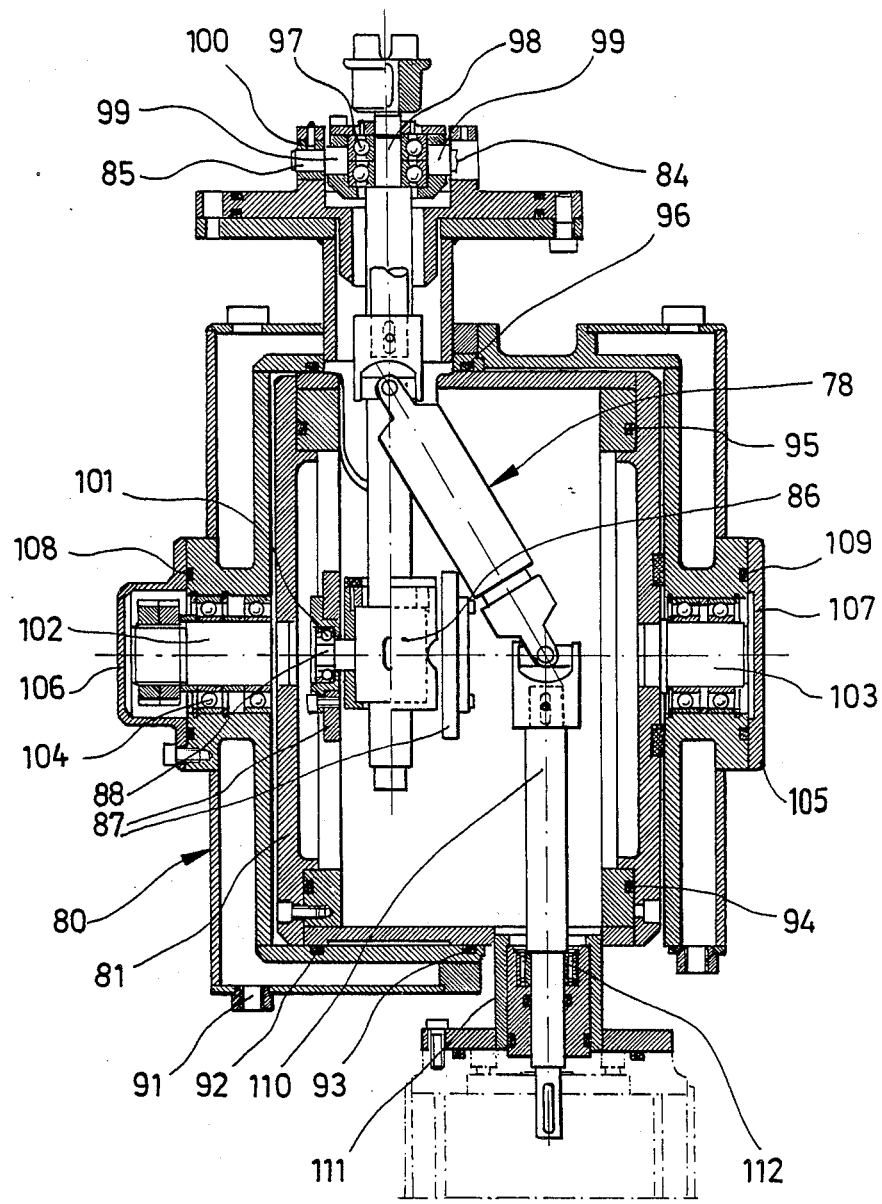
FIG. 5 shows a scetion through the swivel housing along the line IV—IV of FIG. 4.

By a rotary motion of spindle 83 that, owing to the swivelling bearing around axis 85, can shift to the right and to the left in FIG. 4 if the slide 86 moves upwards and downwards, the inner drum 81 can be swivelled to the left and right side in the direction of arrow B of FIG. 1. Since the housing 11 is fixedly connected to the drum by the weld seams 90, the gear housing 11 also performes the swivelling motion of drum 81 around the first horizontal axis 12. FIG. 5, representing a section along the line V—V in FIG. 4, shows that the outer housing 80 of the swivel housing 10 is largely designed with double walls and has cooling water connections for cooling of the entire swivel housing. The drum 81 is hermetically sealed by o-rings 92, 93, 94, 95, 96 to avoid that during the swivelling motion slots or gaps with the outer housing will occur through which dust from the spray chamber could penetrate.

Moreover, the figure shows the detailed structure of bearing 84. This bearing comprises a grooved bearing 97 for rotary transmission leadthrough of the drive shaft extension 98. The bearing journals 99 hold the grooved bearing 98, swivelling around axis 85, in the sliding bearings 100.

The drive slide 86 is fastened to two bearing brackets 87 and running on roller bearings 101 through which the drive is transmitted to the bearing journals 99 where it is converted into a rotary motion of drum 81. The drum 81 is also fastened with bearing journals 102 and 103 in respective roller bearings 104 and 105 in housing 80. These bearings, too, are hermetically sealed by covers 106 and 107 and by o-ring seals 108 and 109.

Figure 6:
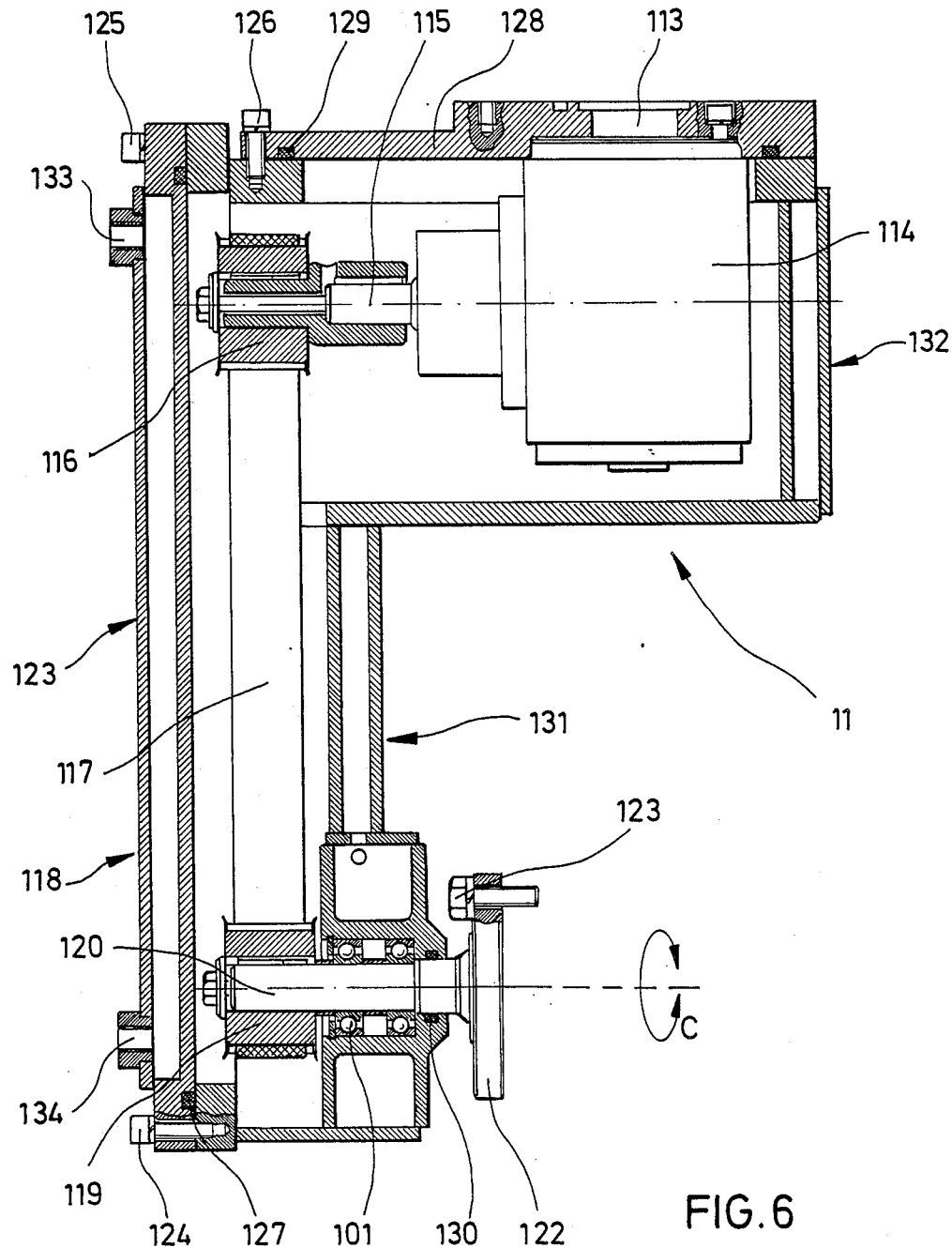
FIG. 6 shows a longitudinal section through the gear housing.

Towards the bottom side, this swivel housing is joined by the gear housing 11 which, as mentioned, has a fixed turning connection to the drum 81. The gear housing is shown in a longitudinal section on FIG. 6 and will be described in the following. The shaft extension 110 of the cardan shaft 78 is led through a leadthrough 111 and a sliding bearing 112 located in this leadthrough 111 (cp. FIG. 5) from the top through the opening 113 into the gear housing 11. There the drive motion is transformed via a bevel gear 114, not shown in detail, into a drive motion of the shaft 115. A toothed belt pulley 116 is fastened to this shaft. The rotary motion of the shaft 115 is transmitted via a toothed belt 117 through a vertical housing part to a bottom toothed belt pulley 119 attached to a shaft 120. The shaft 120 is led through the housing by means of a roller bearing 121. Outside the housing, a flange 122 is welded to this shaft 121. The gun 4, not shown in FIG. 6, is screwed onto the flange 122 by means of screws 123 and has fixed turning connection. By this drive, the gun can swivel around the second horizontal axis C which is determined by shaft 120.

The rear wall 123 of gear housing 11 can be removed from the housing by unscrewing screws 124 and 125 in order to mount drive elements such as toothed belt pulleys 116 and 119, and the toothed belt 117 as well as the angular gear 114. Sealing of the rear wall 123 is by an o-ring 127. The cover 128 providing the connection to swivel housing 10 can also be removed (screws 128) and is also sealed by an o-ring 129. A further o-ring 130 seals the shaft 120; this provides dust-proof and vacuum-tight sealing of the entire gear housing 11.

The rear wall 123 is double-walled like the other vertical walls 131 and 132 of the gear housing 11. During operation cooling water, entering and leaving the gear housing 11 through connections 133 and 134, flows through these double walls.

This provides water-cooling also of the gear housing. The drive elements located in the gear housing 11 are thus shielded against the high temperatures produced in the spray chamber defined by vessel 2.

After assembly of the individual partial housings the inner housing 7 is entirely vacuum-tight and hermetically sealed and it is then filled with argon.

The outer housing 6 can be connected to the interior of the spray chamber 2, i.e. to the spray chamber, with a dust-proof connection line, not shown in detail; this ensures that pressure in the outer housing 6 is always the same as in the spray chamber 2.

For producing a relative motion of the gun 4 as against the workpiece 3, any desired position of the gun 4 can be adjusted or controlled by the above drive systems in one moving direction or in overlapping moving directions. Owing to the chosen axes, namely the vertical moving direction (arrow A) and the two horizontal moving directions B and C, at right angles with each other, the described manipulator 5 is suitable particularly for handling a gun 4 by means of which turbine blades are to be sprayed. All drive systems are hermetically sealed against the spray chamber interior to prevent dirt accumulation in the drive systems. Therefore, the vessel interior has no edges and corners which would be badly accessible for cleaning so that the spray chamber interior can be cleaned very easily. Altogether, reliable and troublefree operation of the entire manipulator is guaranteed by sealing the drive systems.

What is claimed is:

1. A vacuum plasma spray system including a spray chamber (2) in which a workpiece (3) can be placed, means for producing a vacuum in the spray chamber, a motor-driven manipulator (5) including a drive mechanism and a respective control system, and a plasma gun (4) mounted on the manipulator (5) in the spray chamber such that the position of the plasma gun can be changed relative to the workpiece (3) in at least two axes by means of the manipulator (5), the drive mechanism and the control system being hermetically sealed against the spray chamber in housing parts (6,7) of manipulator (5) fastened to the spray chamber (2), the drive mechanism of the manipulator (5) comprising at least two drive groups of which a first drive group (21) facilitates upward and downward motion (A) of the gun (4) for adjusting the spray distance and a second drive group (44) facilitates a swiveling motion (B) of the gun (4) around a horizontal axis (12); wherein the manipulator (5) has a hermetically sealed outer housing (6) and a hermetically sealed inner housing (7) contained in the outer housing (6), the inner housing (7) contains the second drive group (44), protrudes into the spray chamber and carries the gun (4) situated in the spray chamber, and the first drive group (21) is arranged at least partially in the outer housing (6) to effect lifting or lowering of the inner housing (7) thereby adjusting spray distance.

2. A vacuum plasma spray system according to Claim 1 wherein a third drive group (43) is contained in the inner housing for facilitating a swiveling motion (C) of the gun (4) around a second horizontal axis (13) at a right angle with the horizontal axis (13).

3. Vacuum spray system according to claim 1, wherein
the inner housing is guided by a screw (25) and sliding rods (26) vertically extending in the outer housing (6) and that the drive motor (22) of the first drive group (21) is flanged to the outer housing (6); the drive is led through a rotary transmission leadthrough into the interior of the outer housing (6) and lifts and lowers the inner housing, which is guided by the guiding rods, by turning the screw (25).

4. Vacuum plasma spray system according to claim 3, wherein
o-ring seals (29, 30) are provided at a distance to each other at the rotary transmission leadthrough in axial direction between which back-up evacuation (31) can be effected.

5. Vacuum plasma spray system according to claim 2, wherein
the inner housing (7) comprises the following partial housings:
a drive housing (8) containing the drive motors (45, 56) of the second and third drive group (43, 44) as well as the control systems (67, 68, 72, 73) for the drive groups,
an intermediate housing (9) adjacent to the spray chamber through which the drive shafts (52, 60) of the two drive groups extend,
a swivel housing (10) including a swivel drive mechanism (81, 83, 84, 86, 87) belonging to the second drive group, and
a gear housing (11) which is fastened to the swivel housing (10) and which contains a drive mechanism belonging to the third drive group (43); the gun (4) is fastened to the gear housing (11) and is swivelling around the second horizontal axis (13).

6. Vacuum plasma spray system according to claim 5, wherein
the drive housing (8), the intermediate housing (9), the swivel housing (10) and the gear housing (11) have vacuum-tight connection to each other via intermediate flanges (39, 76, 111).

7. Vacuum plasma spray system according to claim 5, wherein
the second drive group (44) comprises a drive a shaft (60) which is driven by the drive motor (56) of the second drive group (44) via a toothed belt (62) and the rotary motion of which is transformed by means of a swivel mechanism in the swivel housing (10) into swivelling motions (B).

8. Vacuum plasma spray system according to claim 7, wherein
the swivel mechanism comprises a spindle (83) which is connected to the drive shaft and is swivelling around a cross axis (85) and which turns a slide (86) with a respective inside thread; the slide is fastened in bearing brackets (87) and swivels around an axis at a right angle with the spindle axis; the bearing brackets (87) are attached to a drum inside the swivel housing (10), turnable as against an outer housing part (80).

9. Vacuum plasma spray system according to claim 5, wherein
there is a flange (14) on top of the spray chamber (2) to which the vacuum-tight outer housing (6) is fastened and through which the inner housing (7) with its partial housings (8, 9, 10, 11) extends and that a bellows (17) reaching into the spray chamber is attached to the flange (14); the bellows has a vacuum-tight connection to the inner housing (7) in the area of the flange between the intermediate housing (9) and the swivel housing (10).

10. Vacuum plasma spray system according to claim 9, wherein
the bellows (17) extends laterally almost over the whole length of the swivel housing (10) and is fastened to the flange between the intermediate housing (9) and the swivel housing (10) by a dome-shaped recess.

11. Vacuum plasma spray system according to claim 1, wherein
both the outer housing (6) and the inner housing (7) are, at least partially, designed with double walls and are provided with connections (91, 133, 134) for cooling water flow between the double walls.

12. Vacuum plasma spray system according to claim 1, wherein
the interior of the inner housing (7) adapted for filling with inert gas, particularly with argon.

13. Vacuum plasma spray system according to claim 1, wherein
has an interior of the outer housing (6) with pressureconnected with the spray chamber.

14. Vacuum plasma spray system according to claim 1, wherein
the second and the third drive groups can be modified such that the plasma gun (4) performs modified motions, such as a swivelling motion around the axis (13), (motion C,) and a rotary motion around the axis (135), whereby the first drive group (motion A) remains unchanged.

15. Vacuum plasma spray system according to Claim 1, characterized by the fact that the third drive group (43) comprises the following components:
a drive shaft (52), driven by the drive motor (45) of the third drive group via a toothed belt pulley (51) and extending through the intermediate housing (9) into the swivel housing (10),
a cardan shaft (78) as an extension of the drive shaft through the swivel housing (10) and
an angular gear (114), located in the gear housing (11), with a tooted belt transmission (117) which transforms the rotary motion of the drive shaft into a swiveling motion of the gun (4) around the second horizontal axis (C).

* * * * *